April 3, 1951        E. M. DELORAINE ET AL        2,546,984
COMMUNICATION SYSTEM
Filed April 2, 1947
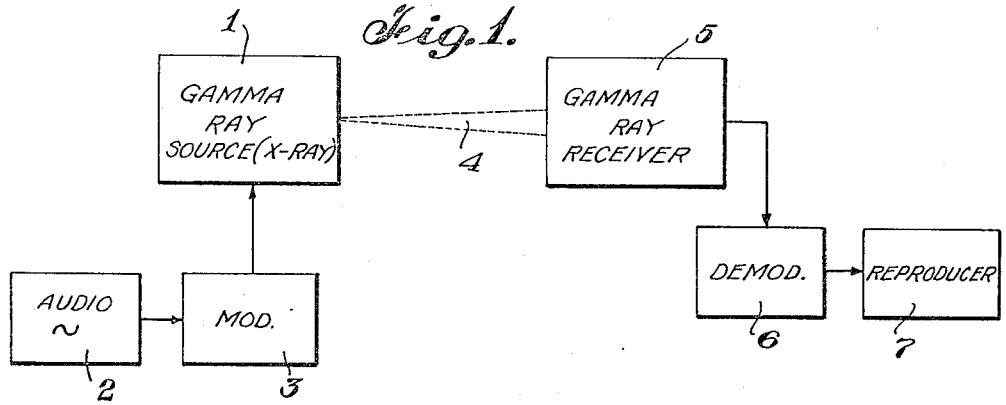
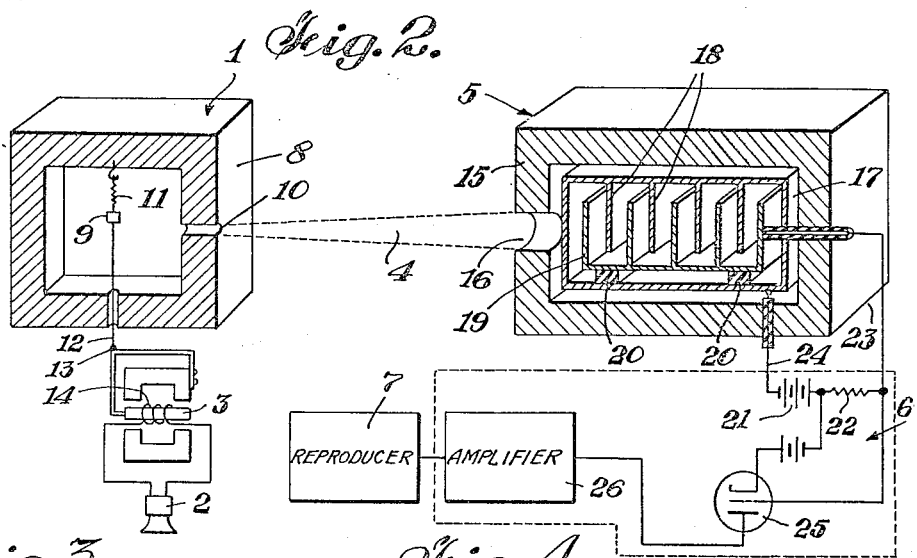
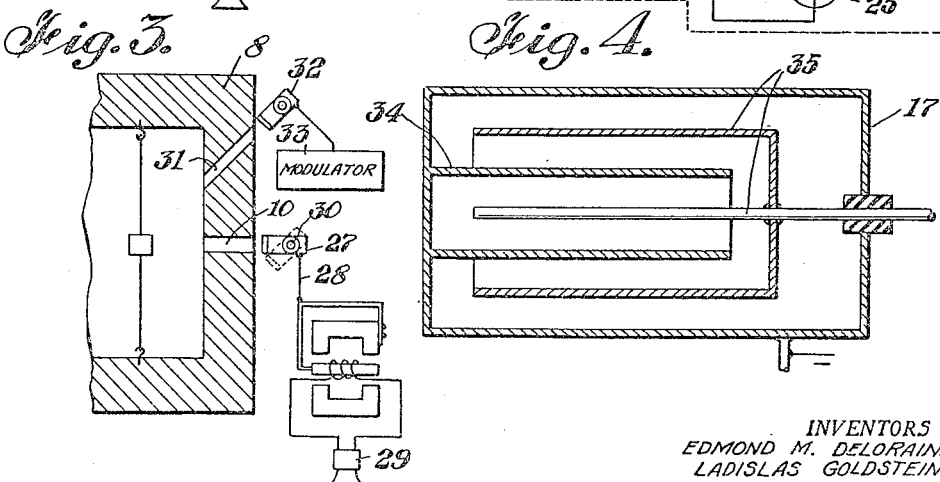
INVENTORS
EDMOND M. DELORAINE
LADISLAS GOLDSTEIN
BY
ATTORNEY Patented Apr. 3, 1951

2,546,984

UNITED STATES PATENT OFFICE 2,546,984

COMMUNICATION SYSTEM

Edmond Maurice Deloraine and Ladislas Goldstein, New York, N. Y., assignors to International Standard Electric Corp., New York, N. Y., a corporation of Delaware Application April 2, 1947, Serial No. 738,774

6 Claims. (Cl. 250—1)

This invention relates to communication systems and more precisely to communication systems for transmission and/or reception utilizing high energy rays corresponding to high voltage X-rays or gamma ray radiation, high energy neutrons or the like.

Various types of energy radiation such as the X-ray photons, gamma ray photons emitted from natural substances such as radium in the presence of its derivatives and photons radiated from artificial radio-active substances or other energy radiations such as neutrons have been used to a limited extent. For example X-rays have been used for the production of pictures and even premodulated to produce motion pictures. However, heretofore none of these radiations have been made use of for the purpose of transmitting and receiving intelligence signals and no suitable equipment for such signaling has been devised. These various types of energy radiations of sufficiently high voltage for transmission to a distance are utilized in accordance with the present invention for the transmission of such intelligence signals. The radiations of this type are designated herein as penetrating radiations or rays for want of a better generic term. Accordingly, as used in this specification this term will be understood to refer to energy transmission as above described.

It is accordingly an object of our invention to provide a communication system for radiating penetrating rays modulated in accordance with signal intelligence in combination with means for receiving these rays and means for demodulating the rays to reproduce the signal.

It is another object of our invention to provide a transmitter arrangement comprising a source of penetrating radiations having energy greater than a million electron volts together with means for signal modulating this radiation.

It is a further object of our invention to provide a receiver for modulated penetrating ray energy including means for producing electrical energy in response to the received penetrating energy and means for reproducing demodulations from this electrical energy.

It is a still further object of our invention to provide a transmitter wherein a source of penetrating ray energy such as radium in the presence of its derivatives or some artificial radio-active substance is provided with means for modulating the energy therefrom by means of relative movement of this primary radiating source with respect to an absorbing shutter screen.

According to a feature of our invention, energy may be transmitted from some source of radiation and signal modulated in accordance with this source with desired signals. The signal modulation may be made in the case of a radiating body by surrounding the body with an absorbing shield of metal provided with a small radiating opening and moving the radiated body with respect to the opening so that the walls of the chamber serve substantially as a shutter. Alternatively, a shutter of metal may be provided in front of the opening and moved in accordance with the signaling intelligence. A further alternative source may be a high voltage X-ray tube or other type of accelerating means such as the "betatron" in which is provided signal modulating means for modulating the energy and intensity of the beam.

The receiving equipment may constitute an ionization chamber wherein the rays which penetrate the cylinder will produce therein electrical energy. Possibly instead of utilizing a reduction of pressure, increased gas pressure may be provided whereby greater ionization is provided at higher voltage differences between the elements of such chamber. This voltage difference may then be amplified by any suitable means so as to reproduce signal currents equivalent to the modulated energy received within the equipment. If desired, an absorbing screen or shield may be provided substantially surrounding the receiver except for an opening directed toward the transmitting arrangement so that stray radiations will be reduced in the receiving equipment. Futhermore, the capacity of the receiving equipment unit is so proportioned with respect to the resistance of the system that a time constant sufficiently low to carry the highest frequency modulation energy is provided.

While we have described above the objects and features of our invention, a better understanding thereof as well as other objects and features will become apparent from the particular description thereof made with reference to the accompanying drawings, in which:

Fig. 1 is a block circuit diagram of a complete communication system in accordance with our invention;

Fig. 2 is a partially schematic illustration also partly in section and perspective illustrating a form of transmitter and receiver unit constructed in accordance with the principles of our invention;

Fig. 3 is a fragmentary view of a modified form of transmitter arrangement in accordance with our invention, and;

Fig. 4 is a cross sectional view of an alternative form of energy ray receiving chamber in accordance with the features of our invention.

Turning first to Fig. 1, reference character 1 refers to a source of penetrating radiation which may be a primary source of radiation either natural or artificial or may be some accelerating or generating equipment such as an X-ray tube or a betatron or other type of particle accelerating device. Energy from a signal source 2 may be applied through a modulating means 3 to the primary radiating source 1 to signal modulate the energy beam transmitted therefrom. This energy beam indicated by reference character 4 may be transmitted through space to receiving equipment 5. This receiving equipment 5 is preferably of the type which will serve to translate the received energy rays into some desired form of electrical energy. The electrical energy then is applied to demodulating or amplifying device 6 which may serve to demodulate the received energy or simply to amplify it to reproduce output signal energy. This output signal energy may then be applied to any desired reproducer such as indicated at 7.

In Fig. 2 is illustrated more specifically a particular form of modulator utilizing a primary radiating source of energy. In this system the source or transmitter 1 may comprise, for example, a rectangular box 8 made of some shielding material. The walls of the box 8 are made of sufficient thickness to absorb an optimum portion of energy radiated directly from the primary radiating source 9 mounted therewithin. An opening 10 is provided in the walls of shield 8. The source 9 is preferably spring suspended by some resilient means such as 11 within the chamber so that it is free to move longitudinally into and out of radiating position with respect to opening 10. A rod 12 extends through the lower wall of chamber 1 to electromagnetic plunger 13 which, together with coils 14, form the modulating means 3. The signal energy applied through source 2 will cause rod 12 to move upward or downward bringing the primary radiating source into or away from the opening 10 thus providing a signal modulation of the energy to be transmitted. While we have shown a simplified form of modulation circuit it will be clear that more elaborate systems using the principles known in radio art may be used without departure from the scope of our invention. Since these form no part of the present invention they have been omitted for the interest of simplicity.

At the receiver 5 the primary responsive equipment may be housed within a shielding wall 15 of an energy absorbing material to protect the apparatus from stray radiations. An opening 16 in the wall 15 may be aligned substantially with the opening 10 at the transmitter to admit the modulated rays readily into the casing. Within casing 15 is mounted a closed container 17 provided with capacitive elements 18 extending downwardly into the chamber formed within. A second set of plates capacitively associated with plates 18 is shown at 19 mounted in insulated relations to the walls of chamber 17 by means of insulating blocks 20. A source of potential 21 is coupled in series with a high resistor 22 and over lines 23 and 24 to the respective plates 18 and 19 of the chamber. The capacitive reactance of plates 18 and 19 and the resistance value of resistor 22 are so chosen that the time constant of this circuit will be sufficiently small to take care of variations of frequency of the received modulation. The rays penetrating within chamber 17 produce secondary emission from the walls of the chamber and the extended plates 18 and 19 and ionize the gas contained within the chamber rendering it conductive. By utilizing relatively high pressure of gas within this chamber the ionization may be relatively high. By reason of the potential difference between plates 18 and 19, the released electrons and negative ions will be attracted toward the positive plates and the positive ions to the negative plates producing a current flow to resistor 22 varying in accordance with the modulation of the received energy radiation means. A coupling tube 25 has its input coupled across resistor 22 and its output coupled to amplifier 25. Thus the variation in voltage produced in resistor 22 will be applied to amplifier 25 and from there the amplified energy may be applied to reproducer 7.

In Figure 3 is shown another alternative form of transmitter circuit. In accordance with this arrangement the energy source 9 is not movably suspended but is mounted in a fixed relation in front of opening 10. A shutter element 27 is mounted in front of opening 10 and controlled by some means 28 such as microphone element 29. Movement of the diaphragm in 29 through the mechanism 28 may be such as to move shutter 27 with respect to opening 10. As shown in Figure 3, shutter 27 is pivoted at point 30 and is rotated around this pivot so as to vary the amount of absorbing material in front of the opening. It will be clear to those skilled in the art that other mechanisms such as means for moving shutter 30 linearly in front of the opening, or the divided shutter with means for bringing the parts together may be provided if desired. The element 30 is preferably made to have a length substantially equal to the thickness of the shielding walls of shield 8 so as to present substantially the same absorbing properties as such walls when in its normal unoperated position. Thus, upon movement of this element by voice signal, a change in absorption takes place providing a modulation of the energy emitted through opening 10 will be obtained. For transmitting in other directions additional openings such as shown at 31 and separate shutters 32 and modulator 33 may be provided.

In Figure 4 is show an alternative structural arrangement for the chamber 17. In accordance with this arrangement the capacitive wall fastened to the chamber 17 may be in the form of a cylindrical element such as shown at 34 and the alternative structure of the other capacitively related element may be a series of concentric cylindrical arrangements shown at 35. Although only a small number of such cylinders are illustrated it is clear that the number may be multiplied as desired to achieve the operations and characteristics required.

While we have described the receiver as utilizing gas under pressure thus producing an integration of the received energy, it is clear that other forms of receiver equipment may be used. For example, by using rarefied gas, the action of the circuit will be more nearly like the ordinary Geiger counter. The counter derives its energy directly from ionization within the chamber. Such counter arrangement provides essentially amplification in that the ionized particles tend to expand and ionize further particles within the chamber. The time constant of such a circuit is relatively low and the de-ionization time is also low, producing a high resolving power. There are, however, certain difficulties in the use of such an arrangement which may render the use of gas under pressure preferable in this system. The current produced in such a system cannot be used directly in the loudspeaker even after proper amplification since it will register to a much greater extent cosmic ray pulses and other interfering phenomena. Furthermore, the Geiger counter is generally of small volume in view of the high direct current field necessary between the electrodes for amplification. This small size while minimizing the cosmic ray effect also minimizes the useful reception.

For the direct-transmission energy rays (corresponding to energies of over a million electron volts) are to be modulated by the frequency of the human voice. Accordingly, for amplitude modulation the depth of modulation should be 50% or more. For radiations of over one megavolt energy, the absorbing shutter around the transmitter and receiver should have a thickness of the order 12 millimeters' lead. This shutter may be made preferably of material of high density such as lead, gold, mercury, or iron for gamma rays. For neutrons a low density material such as paraffin, beryllium or carbon etc. may be used.

A source of gamma radiations within the desired energy range may be obtained for example, from radium contained in a sealed tube. However, due to the small quantities of radium available, it is desirable that some of the other metals which will emit gamma radiations within the desired range be used or others that will produce neutrons in the desired amount. Although there are more than 400 radio active elements known which may be artificially produced there is a much smaller number, which can be activated by neutrons and which will emit gamma rays in the required range and have a half-life period of over two months. The known elements are cobalt (Co 60), scandium (Sc 46), zinc (Zn 65), antimony (Sb 123), tantalum (Ta 182), radio active silver (Ag 108 or 110) which has 225 days half-life. There is, however, only one element of this group with half life of over one year. This element is cobalt with a mass number 60. Such cobalt has a half life range of five years and it is interesting to note that this radio active cobalt in a quantity equivalent to 100 g. of radium weighs only $7 \times 10^{-2}$ grams, if it could be prepared without any carrier substance making it sufficiently light to be readily mounted in the movable source as described above. It is also clear that high voltage electron producing machines may be used as the energy sources, and may be directly modulated.

The opening in the shield for transmission purposes as described need be no more than about 1 millimeter so that the shutter arrangement likewise may be made relatively light so that it will respond to high frequency audio energies. Except for protective purposes no shield need be provided. Moreover, modulating shutters aligned in different directions may be provided, permitting multi-beam transmission from a single source.

For the gas to be used within the receiving chamber, a non-electronegative gas (rare gas) at a relatively high pressure, of 20 to 50 atmospheres of argon, for example, is preferable. Other non-electronegative gases may be considered such as $N_2$ or $SF_6$. For comparable high sensitivity $SF_6$ may be used at lower pressure (for example, 5 atmospheres) than either argon or nitrogen.

The electrode arrangements in the receiving chamber should be such as to provide a high field strength in order to have high speed response to the ionizing radiation. This means that the distance between electrodes should be short without conflicting with the best possible use of the energy for ionization of gases within the chamber. By utilizing a plurality of the extensions, large surface may be provided, thereby increasing the wall effect of the gamma rays. The thickness of the electrodes facing each other should be chosen for maximum yields of produced electrons. This thickness of the electrode elements will vary for different gas pressures. The closed ionization chamber may be considered as one of the circuit elements. The resistance used with the potential source is determined by the potential difference required between the electrodes of the chamber and is inversely proportional to the ionization radiation intensity. For passage of frequencies up to 400 cycles, it can be considered that the ions produced in the chamber must reach a collecting surface within at least $1/400$ of a second. The necessary field intensity for this purpose would be about 10,000 volts per centimeter. For this purpose and at this frequency it is clear that the time constant of the circuit must be smaller than $1/400$ of a second and should be at least two or three times less, that is, one thousandth of a second. Thus, the capacity of the chamber is given as C1, that of the tube as C2 and the resistance is R; the time constant will be the total capacity C multiplied by R. It is therefore seen that the high sensitivity R should be as high as possible so that for a desired time constant then the capacity C should be as small as possible.

It will be clear that in addition to the wanted signal, stray radiations will penetrate the chamber of the receiver and produce certain interference and distortion. If, however, this penetrating energy is substantially constant, it will correspond merely to a D. C. component added to the output of the system and will therefore not be difficult to be removed.

While we have disclosed generally the principles and operation of our system, it is to be distinctly understood that this specific description is given merely by way of example and that many modifications may be made without departing from the spirit thereof. It will be likewise clear that specific calculations of values for the various elements may be readily made by those skilled in the art from the known radiation phenomena and other known factors. It is therefore to be understood that the specific examples and structures described in this specification are given merely by way of example and are not to be considered as any limitations on the scope of our invention.

We claim:

1. A receiver for signal modulated penetrating rays comprising an energy absorbing shield provided with an opening in the direction from which it is desired to receive energy, inclosing a chamber of metal, a metallic member mounted within said chamber and insulated therefrom, first extensions fastened to the wall of said chamber to provide additional surface, extensions mounted on said member in capacitive relation to said first extensions, a non-electronegative gas within said chamber, a high resistance, a source of direct potential coupled in series with said high resistance between said member and said chamber, said resistance being of such a value with respect to the capacity of said system as to provide a time constant lower than the frequency of received signals, an amplifier coupled across said resistance and reproducing means coupled to said amplifier.

2. A receiver for signal modulated penetrating energy rays comprising an energy absorbing shield provided with an opening in the direction from which it is desired to receive energy, inclosing a chamber of metal, a metallic member mounted within said chamber and insulated therefrom, first extensions fastened to the wall of said chamber to provide additional surface, extensions mounted on said member in capacitive relation to said first extensions, a non-electronegative gas at a pressure greater than 5 atmospheres within said chamber, a high resistance, a source of direct potential coupled in series with said high resistance between said member and said chamber, said resistance being of such a value with respect to the capacity of said system as to provide a time constant lower than the frequency of received signals, an amplifier coupled across said resistance, and reproducing means coupled to said amplifier.

3. A receiver for signal modulated nuclear energy rays comprising an energy absorbing shield provided with an opening in the direction from which it is desired to receive energy, inclosing a chamber of metal, a metallic member mounted within said chamber and insulated therefrom, substantially planar first extensions fastened to the wall of said chamber to provide additional surface, substantially planar extensions mounted on said member parallel to and in capacitive relation with said first extensions, a non-electronegative gas within said chamber, a high resistance, a source of direct potential coupled in series with said high resistance between said member and said chamber, said resistance being of such a value with respect to the capacity of said system as to provide a time constant higher than the frequency of received signals, an amplifier coupled across said resistance, and reproducing means coupled to said amplifier.

4. A signalling system comprising a source of penetrating radiation having energy greater than a million electron volts and means for signal modulating said radiation, said means for modulating comprising an absorbing shield provided with an opening and surrounding said source, and means for controlling the position of said source relative to said opening.

5. A communication system comprising a radio active source of high energy penetrating energy emissions, having a half-life period over two months and means for signal modulating said radiations, said means for modulation comprising an absorbing shield substantially surrounding said source, and provided with a small opening, and means for controlling the position of said source relative to said opening in response to said signals.

6. A communication system comprising a radio active source of high energy photon emissions, comprising cobalt 60, and means for signal modulating said radiations, said means for modulating comprising an absorbing shield of lead having a thickness of at least twelve millimeters substantially surrounding said source, and provided with an opening of about one millimeter in diameter, and means for controlling the position of said source relative to said opening in response to said signals.

EDMOND MAURICE DELORAINE.
LADISLAS GOLDSTEIN.

REFERENCES CITED

The following references are of record in the file of this patent:

UNITED STATES PATENTS

| Number | Name | Date |
|---|---|---|
| 2,079,732 | Conley | May 11, 1937 |
| 2,079,861 | Keith | May 11, 1937 |
| 2,275,747 | Fearon | Mar. 10, 1942 |
| 2,275,748 | Fearon | Mar. 10, 1942 |
| 2,345,445 | Atwood | Mar. 28, 1944 |
| 2,411,400 | Weber | Nov. 19, 1946 |

FOREIGN PATENTS

| Number | Country | Date |
|---|---|---|
| 309,834 | Germany | Nov. 18, 1918 |

OTHER REFERENCES

Radiological Defense, vol. 1, issued by AFSWP, January 22, 1948, pp. 35, 36, 65, 66.